US011871228B2

(12) United States Patent
Vladimerou

(10) Patent No.: US 11,871,228 B2
(45) Date of Patent: Jan. 9, 2024

(54) SYSTEM AND METHOD OF MANUFACTURER-APPROVED ACCESS TO VEHICLE SENSOR DATA BY MOBILE APPLICATION

(71) Applicant: TOYOTA MOTOR ENGINEERING & MANUFACTURING NORTH AMERICA, INC., Plano, TX (US)

(72) Inventor: Vladimeros Vladimerou, Whitmore Lake, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 253 days.

(21) Appl. No.: 16/901,067

(22) Filed: Jun. 15, 2020

(65) Prior Publication Data
US 2021/0392496 A1 Dec. 16, 2021

(51) Int. Cl.
| | |
|---|---|
| *B60W 50/06* | (2006.01) |
| *G01C 21/36* | (2006.01) |
| *H04W 12/03* | (2021.01) |
| *H04W 12/041* | (2021.01) |
| *H04W 12/0431* | (2021.01) |
| *H04W 12/06* | (2021.01) |
| *H04W 12/08* | (2021.01) |

(Continued)

(52) U.S. Cl.
CPC ............ *H04W 12/08* (2013.01); *B60W 50/06* (2013.01); *H04W 12/03* (2021.01); *H04W 12/041* (2021.01); *H04W 12/0431* (2021.01); *H04W 12/06* (2013.01); *H04W 12/63* (2021.01); *G01C 21/3691* (2013.01); *G06F 8/65* (2013.01)

(58) Field of Classification Search
CPC ... H04W 12/08; H04W 12/03; H04W 12/041; H04W 12/0431; H04W 12/06; H04W 12/63; H04W 12/033; H04W 12/61; H04W 12/76; H04W 12/069; G01C 21/3691; G01C 21/3697; B60W 50/06; G06F 8/65
See application file for complete search history.

(56) References Cited

U.S. PATENT DOCUMENTS

| 9,363,734 B2 | 6/2016 | Rajeevalochana et al. |
| 10,332,208 B1 | 6/2019 | Loo et al. |

(Continued)

FOREIGN PATENT DOCUMENTS

DE  100 55 059 A1  5/2002

*Primary Examiner* — Michael Simitoski
*Assistant Examiner* — Andrew Suh
(74) *Attorney, Agent, or Firm* — Oblon, McClelland, Maier & Neustadt, L.L.P.

(57) ABSTRACT

A subscription system and method of facilitating permission-based access to a subset of vehicle sensor data in a vehicle electronic control unit (ECU) to augment an information application. The system includes a vehicle subscription server. The method includes generating, by the vehicle subscription server, a sensor key and a subscription key, installing in a memory of the vehicle ECU the vehicle sensor key. In response to a request for a subscription by a mobile device, transmitting by the vehicle subscription server the subscription key. The vehicle ECU uses the subscription key to authenticate the mobile device as having a current subscription, and augments the information application with the subset of vehicle sensor data accessed based on the sensor subscription key.

20 Claims, 9 Drawing Sheets

(51) Int. Cl.
   *H04W 12/63*       (2021.01)
   *G06F 8/65*        (2018.01)

(56)             References Cited

U.S. PATENT DOCUMENTS

| | | | |
|---|---|---|---|
| 10,368,333 | B2 | 7/2019 | Aggarwal et al. |
| 10,440,451 | B2 | 10/2019 | Balakrishnan et al. |
| 11,042,816 | B2* | 6/2021 | Zaid ..................... H04W 4/027 |
| 2012/0095643 | A1 | 4/2012 | Bose et al. |
| 2014/0169564 | A1* | 6/2014 | Gautama ............ G07C 9/00309 |
| | | | 380/270 |
| 2016/0196613 | A1 | 7/2016 | Miles et al. |
| 2017/0134164 | A1* | 5/2017 | Haga ..................... B60R 16/023 |
| 2017/0345227 | A1* | 11/2017 | Allen, Jr. ............... G06F 16/951 |
| 2018/0261020 | A1 | 9/2018 | Petousis et al. |
| 2019/0213022 | A1* | 7/2019 | Golgiri ................. B60K 37/06 |
| 2019/0333387 | A1 | 10/2019 | Lau et al. |
| 2019/0370699 | A1* | 12/2019 | Chaplow ............... H04L 63/0823 |
| 2020/0153636 | A1* | 5/2020 | Takada ................... H04W 4/40 |
| 2020/0364647 | A1* | 11/2020 | Degen .................... G06Q 10/08 |
| 2020/0382313 | A1* | 12/2020 | Oguchi ............... H04L 67/2852 |
| 2020/0389791 | A1* | 12/2020 | Takemori .................. H04L 9/32 |
| 2021/0099308 | A1* | 4/2021 | Abbas .................. H04L 9/3242 |
| 2021/0273819 | A1* | 9/2021 | Rueckriemen ....... G06Q 30/018 |

* cited by examiner

SYSTEM AND METHOD OF MANUFACTURER-APPROVED ACCESS TO VEHICLE SENSOR DATA BY MOBILE APPLICATION

BACKGROUND

Technical Field

The present disclosure is directed to a system and method that enables, via a subscription, a software application to access vehicle sensor data, perform sensor fusion and processing, and provide services to the driver or vehicle user.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Typically, vehicle sensor data is processed internally within the vehicle for purposes including to control vehicle functions and to provide information to the vehicle driver or the vehicle user. Vendors, such as live traffic map providers, feature map providers, navigation and advanced driver support would benefit from in-vehicle sensor data. Vendors do not have direct access to in-vehicle sensor data related to control of vehicle functions. Instead, vendors rely on third party information or smartphone mounted sensors to obtain information related to a vehicle, such as its location. Vendors typically rely on user input for vehicle operation-related information such as start miles, end miles, amount of gasoline.

An automotive Original Equipment Manufacturer (OEM) may be able to configure a vehicle to provide vehicle sensor data to vendors by way of a software application, such as a mobile device application (typically referred to as an App). However, the equipment cost and data upload cost would be significant. Also designing and maintaining mobile device applications would involve substantial resources and cost. For example, the automotive OEM would have to provide an interface to a vehicle owner's smartphone, radio devices, and infrastructure to support security of communications.

There is a need to allow entities that specialize in mobile device applications and services to design specialized services that use automotive sensor inputs directly from the vehicle. There is a need to avoid OEM-provided network connectivity between a vehicle and third party. Further, there is a need to avoid costs associated with storing large amounts of data.

It is one object of the present disclosure to describe a system and method that provides access to vehicle sensor data by way of a mobile application (App) using a subscription service. It is an object to shift some computing power to outside the vehicle. An object is to minimize in-vehicle memory requirements.

SUMMARY

An aspect a subscription method of facilitating permission-based access to a subset of vehicle sensor data in a vehicle electronic control unit (ECU) to augment an information application. The method includes generating, by a vehicle subscription server, at least one vehicle sensor key and at least one subscription key, installing, in a memory of the vehicle ECU, the at least one vehicle sensor key, in response to a request for a subscription by a mobile device, transmitting, by the vehicle subscription server, the at least one subscription key, using the at least one subscription key to authenticate the mobile device as having obtained the subscription, and augmenting, by the vehicle ECU, the information application with the subset of the vehicle sensor data accessed based on the at least one vehicle sensor key.

An aspect is a system for facilitating permission-based access to a subset of vehicle sensor data to augment an information application. The system includes a vehicle subscription server configured to generate at least one sensor public key and at least one subscription private key, each having respective predetermined expiration dates; a vehicle ECU connected to a plurality of in-vehicle sensors; a memory of the vehicle ECU to store the at least one sensor public key. In response to a request for the subscription by the information application, the vehicle subscription server is configured to transmit the at least one subscription private key. The vehicle ECU is configured to encrypt and augment the information application with the subset of the vehicle sensor data, using the sensor public key, to be decrypted based on the at least one subscription private key.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
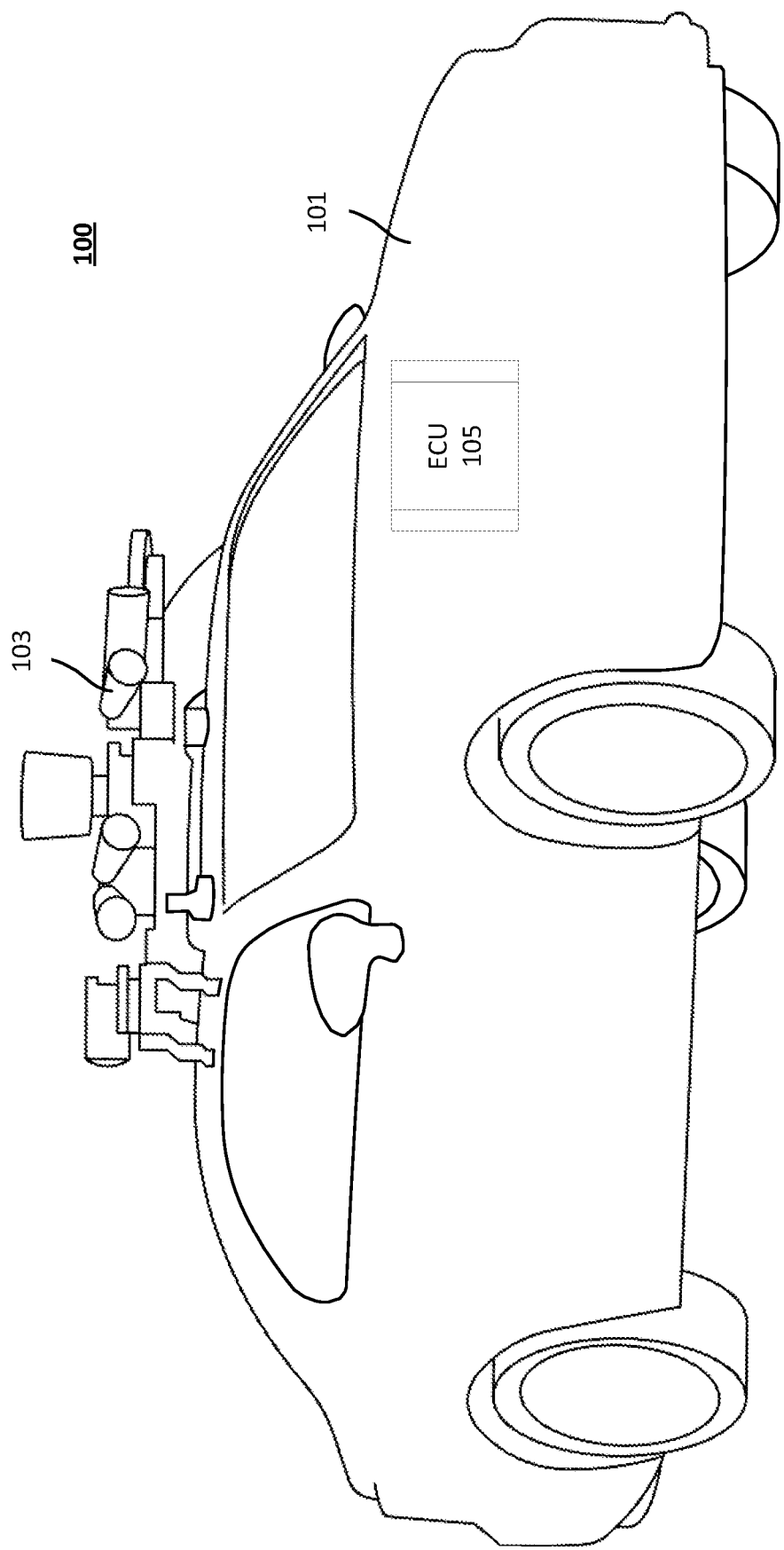
FIG. 1 is a schematic diagram of a vehicle equipped with sensors and a controller.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

Aspects of this disclosure are directed to a system for communication between a mobile app and a vehicle to directly access vehicle sensor data facilitated by a subscription service managed within a cloud service. In this disclosure, a subscription is an agreement between a service provider (subscriber) and a vehicle OEM or after-market vehicle service authorized by the OEM to make modifications to a vehicle. The agreement grants to the subscriber access to specific sensor data of a group of vehicles for a specified period of time. In some aspects, the subscription includes a subscription fee. The subscription enables minimizing costs to the subscriber by controlling the access to sensor data only as needed. The subscription can be tailored based on needs of the subscriber and available equipment and its capabilities.

Referring to FIG. 1, a vehicle 100 may be provided with advanced features ranging from various advanced safety features to self-driving to fully automated (no driver or passenger). For purposes of this disclosure, a vehicle may be any ground vehicle, including, but not limited to, automotive vehicles and trucks, as well as off-road work vehicles and specialized military vehicles. A vehicle may also include airborne vehicles, such as drones. Because vehicles may include self-driving vehicles or autonomous vehicles, a vehicle may not have a driver, and in some cases may not include a passenger. FIG. 1 illustrates a vehicle having an array of sensors 103. The vehicle 100 may have other configurations, such as where sensors are arranged in the vehicle body, and where vehicles vary in type and quantity. In FIG. 1, sensors are shown in a non-limiting example as being mounted on a roof of a vehicle. These and other sensors may be mounted on the vehicle body 101, and may be included within the body of a vehicle, or a combination thereof. Examples of the types of sensors that may be mounted on a roof of a vehicle may include LIDAR, video cameras, radar antennas, and sonar antennas. Video cameras, radar antennas, and sonar antennas may be located around a periphery of the vehicle. In particular, the vehicle may be fitted with forward-looking cameras to detect traffic signals, as well as front-mounted sensors to detect vehicles, pedestrians, and obstacles to determine traffic conditions, such as intersections and merging traffic lanes, in the vehicle's vicinity. The combination of sensors may be aimed, for example, to help drivers choose the safest routes possible or to alert the driver of the environment around the vehicle, including traffic conditions and objects in the vicinity of the vehicle.

A vehicle 100 may include sensors for monitoring conditions within the vehicle. A vehicle 100 may include sensors for monitoring the cabin environmental conditions. The cabin of a vehicle may include various sensors, for example, a thermometer, video cameras and infrared sensors for monitoring persons and other objects within the vehicle cabin. A vehicle may include internal sensors for monitoring various conditions of the vehicle operation, such as steering angle and vehicle speed. Also, the vehicle engine may include various sensors for pressure, temperature, air flow and engine speed. The engine sensors may include an intake manifold pressure (MAP) sensor, boost pressure sensor, a measured air flow (MAF) sensor, compressor flow sensor, and an engine speed reader. Tires may include pressure sensors for measuring the tire pressure. Provided readings from the sensors, other parameters may be estimated or measured, which are referred to as estimators. Estimators related to the engine may include burnt gas fractions for the intake and exhaust, torque, exhaust temperature, intake temperature, NOx, exhaust pressure, turbine speed, and air-fuel ratio.

The vehicle 100 typically has at least one controller module, or simply controller, that receives signals from the sensors. The controller may receive various sensor signals and provide them as is to applications, or compute estimators based on the sensor signals. In some cases, sensors, such as a LiDAR, may include its own dedicated processor. The control module of a vehicle may also be referred to as an Electronic Control Unit (ECU) and may control vehicle functions for purposes of safety and fuel efficiency, as well as for informing the driver of various vehicle conditions and vehicle environment conditions. The ECU 105 may include a microcontroller. A microcontroller may contain one or more processor cores (CPUs) along with on-chip memory (volatile and non-volatile) and programmable input/output peripherals. Program memory in the form of flash, ROM, EPROM, or EEPROM is often included on chip, as well as a secondary RAM for data storage.

Figure 2:
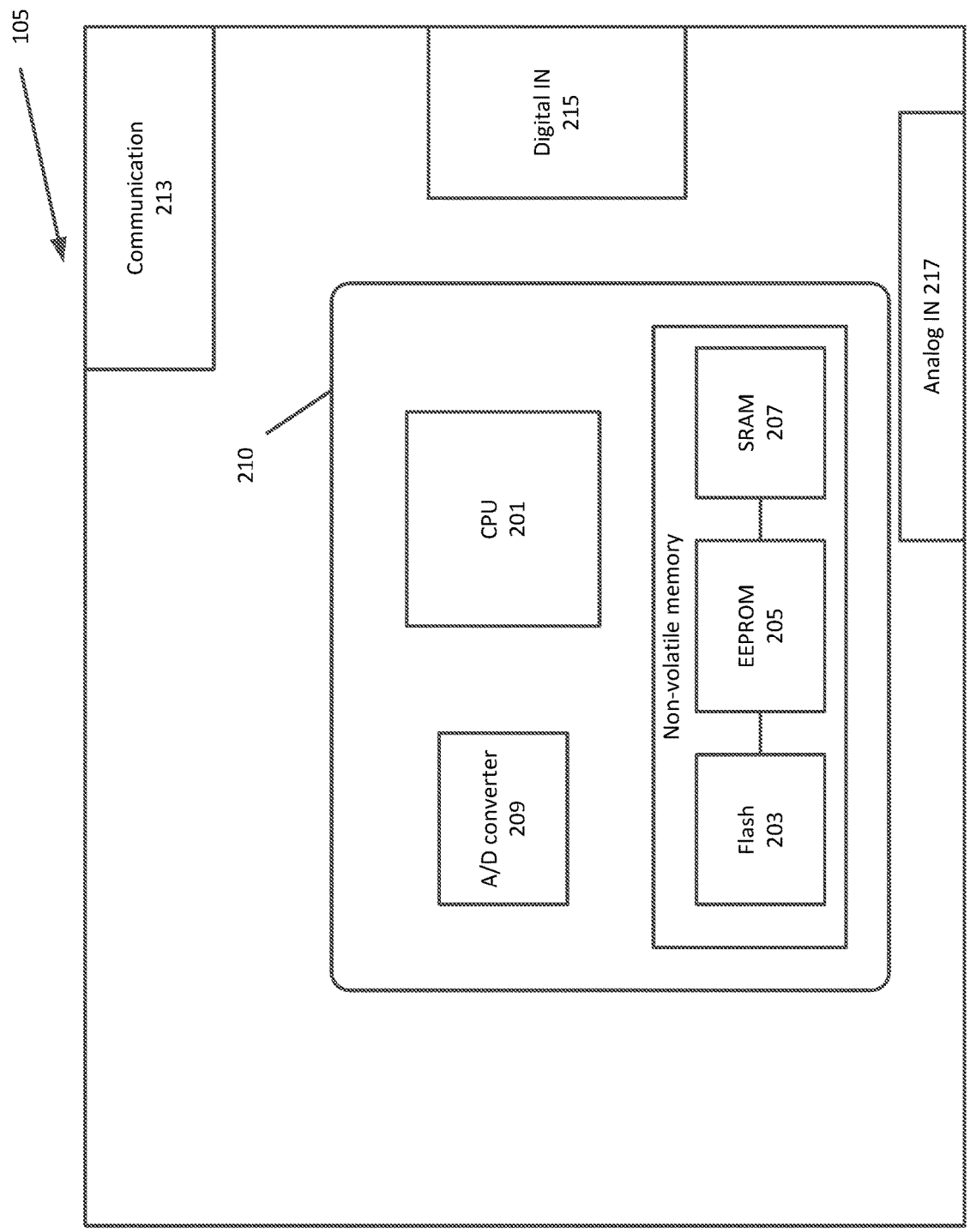
FIG. 2 is a block diagram of a computer system for the controller.

In one embodiment, regarding FIG. 2 the ECU 105 may be a computer-based system that is an integrated circuit board with a microcontroller 210. The board may include digital I/O 215, analog inputs 217, and hardware serial ports 213.

In one embodiment, the microcontroller is a RISC-based microcontroller having a flash memory 203, SRAM 207, EEPROM 205, general purpose I/O lines, and an A/D converter 209. The microcontroller may be a single system on chip (SOC). It should be understood that any of various types of microcontrollers may be used. Microcontrollers vary based on the number of processing cores, size of non-volatile memory, the size of data memory, as well as whether or not they include an A/D converter or D/A converter.

Third parties offer various information providing services for use by vehicle users and drivers. Some services are provided in mobile applications (often referred to as an App, or mobile App, or smartphone App). An App may be software that can be installed in various platforms, such as a smart TV, tablet computer, smartphone, or other mobile device. One example of a third party service is a car maintenance tracking app for Android or iPhone type smartphones. A car maintenance tracking app allows recording of past service events and getting a notification when a vehicle is due for preventive maintenance. Some car maintenance apps can track fuel costs and fuel consumption in a vehicle.

Some third party apps offer the ability to track multiple cars, trucks, and motorcycles for status such as fuel consumption and mileage, maintenance records, and service interval tracking. Some third party apps include syncing the data with the cloud and to multiple devices.

To perform mileage tracking, a third party App may include an option to track a trip. A user may choose and/or input a type of trip. The third party app may record the date, time, and location that the trip is started. Optionally, the start location may be obtained using a GPS location accessed from an internal GPS of the smartphone. Toll charges or parking charges may be entered, or be calculated based on the trip route. The primary service provided by the mileage tracking app is maintenance of a log of mileage traveled over a period of time. The third party app may calculate statistics such as fuel usage and frequency of filling up. Users may keep track of fuel economy, gas prices, and pump totals, and the app will provide reports.

The third party app may use the user's phone's inbuilt GPS to track the car's current speed, the maximum speed, the average speed, direction, total distance travelled and display them on the phone's screen. The user can enter data that can be stored in the app for easy access and set reminders for updates and tasks to be done.

These third party apps would benefit from direct access to vehicle information instead of requiring manual input of vehicle information or relying on approximate information generated by a smartphone or other mobile device. However, vehicle sensors are limited to communication within the vehicle. This is because vehicle sensors may be used to control vehicle operations and thus should not be altered or maliciously tampered with. Vehicle sensors facing outside of a vehicle such as cameras and radar may be used to detect objects such as other vehicles in the vicinity of the host vehicle. Sensed information from the cameras and radar may be used to control vehicle breaking, such as when a camera detects that a vehicle is following with a predetermined distance of another vehicle. Sensed information may be used to provide information to the vehicle driver, such as a warning that a vehicle is on the blind side of the host vehicle, a warning that the host vehicle is following at an unsafe distance behind a preceding vehicle, a warning that a vehicle is following close behind the host vehicle. Vehicle sensors located inside the vehicle cabin may be used to detect the focus of a driver to ensure the driver is viewing through the windshield, and not being distracted or falling asleep.

In order to provide data that is typically entered manually, such as starting miles and ending miles for a trip, a vendor would have to be granted permission to access vehicle miles indicated by a vehicle tachometer. Also, the vendor would have to be provided with information about the vehicle. Such proprietary information needs to be managed so that only known recipients, including the vehicle owner, have access to the vehicle information. The vehicle manufacturer should also have control over what entities have access to certain vehicle information and the manner of access. Access to vehicle information by entities should be capable of being modified, such that entities that have access may be changed to new entities at a later time, or such that access by entities may be terminated at a certain time.

Subscription models are used by industries to control distribution of information. For example, a subscription model is used by cable companies to control distribution of specific sets of content. Subscribers may pay for special packages in which certain channels and possibly streaming services are enabled by the subscription. Another example is a subscription model for mobile Apps obtained from an App store. An App may be downloaded from an App store and a payment for a subscription may be made in order to use the App for a certain period of time, such as monthly or yearly. However, such subscription models are controlled at the source of the App and subscribers are end users that may receive and use the App under the subscription.

It may not be practical for a vehicle itself to sell and manage subscriptions to access its sensor data to subscribers wishing to obtain the data. This subscription model would require that the vehicle control distribution of sets of sensor information under a subscription with the individual subscribers. App developers would not only require access to vehicle sensor data, but would need to establish a subscription with a vehicle. However, vehicles are not equipped to control a subscription service to potentially numerous individual app developers.

Disclosed is a subscription model that app service providers and automobile manufacturers can conform to their needs and equipment. The subscription model enriches services of service providers by granting access to particular subsets of vehicle sensor data as needed.

Figure 3:
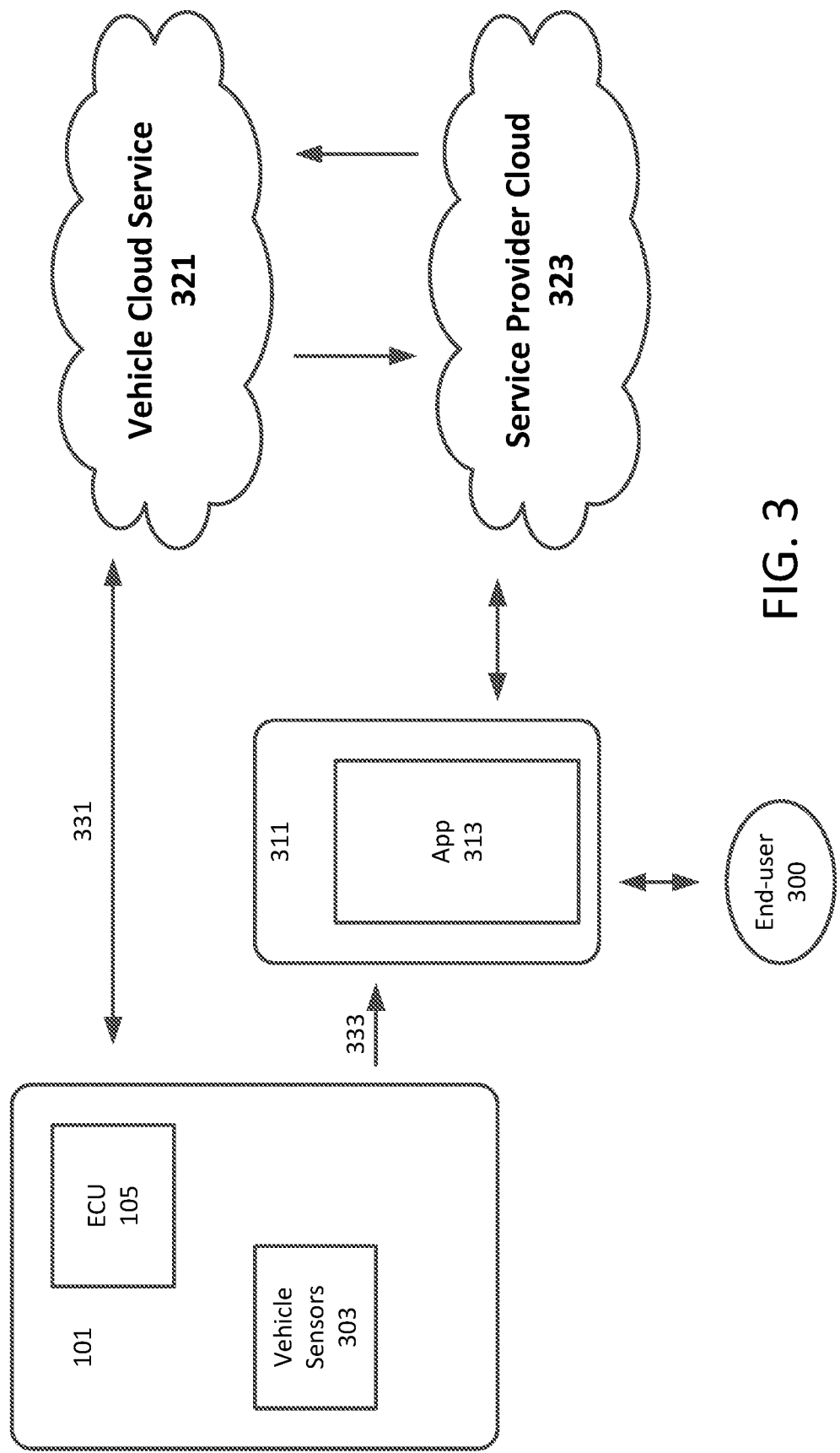
FIG. 3 is a system diagram of a subscription scheme in accordance with an exemplary aspect of the disclosure

FIG. 3 is a system diagram of a subscription scheme in accordance with an exemplary aspect of the disclosure. The system may involve three types of entities, including a vehicle, an App supported by a service provider, and an entity that manages distribution of subscriptions. The entity that manages distribution of subscriptions may control subscriptions using a vehicle cloud service 321. Although the subscription scheme of FIG. 3 shows a vehicle cloud service 321, the vehicle services may be provided in a server computer, network of server computers, or data center, depending on the availability and needs of the vehicle services. A service provider may use its own service provider cloud 323. In a similar manner, the services of the service provider may be provided in a server computer, network of server computers, or data center.

The vehicle cloud service 321 may provide periodic updates to subscription keys service groups of vehicles and a specific subset of sensor information. In such case vehicle 100 is a group of vehicles. The vehicle cloud service 321 may be a private cloud service that is used by a source provider of the vehicle, such as a vehicle original equipment manufacturer (OEM), or a third party after-market installer that is authorized by the OEM to make modifications to the vehicle. Alternatively, the vehicle cloud service 321 may be part of a public cloud service, such as Amazon Web Services. In addition, subscription keys may be tied to a single vehicle, and/or may be tied to a geographic location, such as a region of a country. Subscription keys may be tied to a subset of specific vehicle sensor information, specific vehicle makes and models, and areas where vehicles are sold, for example, vehicles sold in a certain state, region or country. Subscription keys may be tied to particular characteristics of sensor data, such as a specific sensor output rate.

In disclosed embodiments, subscription keys expire at a specified period of time, such as every day, week, or month. The vehicle cloud service 321 is responsible for issuing the subscription keys. For purposes of this disclosure, the subscription keys for controlling access to the subset of sensor information are also referred to as sensor access subscription keys. For example, control over access to a subset of sensor information of a particular vehicle is by way of a sensor access subscription key. Thus, the vehicle OEM or after-market installer controls subscription keys, respective sensor information that the keys allow access to, and the extent of distribution of subscription keys.

The vehicle cloud service 321 generates and stores sensor access subscription keys for each vehicle in a database managed in the vehicle cloud service 321. In preferred embodiments, the database is a relational database of a relational database management system. For a small number of vehicles, the subscription keys may be stored in a table data structure in a flat file. Each vehicle is identified by a Vehicle Identification Number (VIN). The sensor access subscription keys may be generated during manufacturing. Also, during manufacturing initial sensor access subscription keys may be stored in a memory of the vehicle ECU. In some embodiments, the sensor access subscription keys are transmitted and stored in the memory of the vehicle ECU using a secure Internet connection 331, such as Transport layer Security.

A service provider cloud 323 may request a subscription and obtain subscription keys from the vehicle cloud service 321. The service provider may request a subscription based on a request for a specific group of vehicles and subset of vehicle sensors. The subscriptions may be based on a request for a specific geographic area, such as one or more states, a subset of states within region, such as northwest region, southwest region, mid-west region, northeast region, southeast region. A subscription may be based on a request for a specific vehicle make and model, or a set of vehicle make and models. A service provider may distribute an App 313 for smartphones, tablets, other mobile devices including laptop computers, or other computer systems 311. The App 313 may require vehicle data from a specific subset of vehicle sensors so that the App 313 can provide services to an end-user 300 such as a vehicle owner or vehicle user. Services provided by the App 313 may include, but are not limited to, a traffic map, navigation and advanced driver support applications. In order to obtain the vehicle data from the vehicle 101, the App 313 may facilitate an agreement with the vehicle cloud service 321 under the subscription. The agreement may be a contract between the end-user 300 and the service provider that authorizes the App 313 to obtain a subset of vehicle sensor data from an ECU 105 of a vehicle.

Secure communications between an ECU 105 of a vehicle 100 and the vehicle cloud service 321 may be established via factory installed secure communication 331. At a later time, secure communications may be used in order for the vehicle cloud service 321 to perform a check as to whether an App 313 has subscribed to services, and to perform periodic group subscription key updates. Upon making the check, the vehicle ECU 105 may receive a signed App key from a mobile device. The signed App key may be a digitally signed identifier of the App. The signed App key may include a digital signature that is produced in the vehicle cloud service 321 by a signing algorithm using a private key. An example signing algorithm is the Digital Signature Algorithm (DSA). A corresponding public key at the receiving end may be used to verify that the signature is valid. The secure communications may be performed over the Internet using Transport Layer Security, or the like. In some embodiments, a smartphone or other mobile device may serve as an Internet interface for the ECU 105 to update subscription keys through secure communications between the ECU 105 and the vehicle cloud service 321. The ECU 105 may receive sensor data from various vehicle sensors 303. The ECU 105 may output a subset of the sensor data in accordance with the subscription keys.

The subscription keys are related to the subscription terms, including specific vehicle, group of vehicles, specific subset of sensor data accessible by an app, by way of a relationship indicated in the database. The subscription keys generated for the App 313 and the subscription keys generated for the vehicle 100 are stored in the database in association with a subscription, and a subscription has a unique identifier and a time period that the subscription is in effect. Subscription keys are transmitted to the App 313 and the vehicle ECU 105 in a message format that includes a list of identifiers and necessary codes for specific sensor data, and VIN(s) for specific vehicle(s). In some embodiments, region and sensor keys may be common across many vehicles or groups of vehicles so that the app provider 323 (and the vehicle cloud service 321) doesn't have to generate and send different multiple keys among the vehicles.

In some embodiments, vehicles 100 may be connected, such that a host vehicle can communicate environment data with other connected vehicles. For example, a vehicle may collect radar information from its vehicle radar sensor and determine that the radar information indicates heavy traffic on a highway. The information about the heavy traffic may immediately be shared with all connected vehicles in communication range.

Communications between the ECU 105 and a mobile device 311 may be implemented using a short range communications protocol 333, such as Bluetooth or Bluetooth low energy, or via a longer distance communications such as WiFi. In some embodiments, the mobile device 311 may serve to stream post processed sensor information to the service provider cloud 323 using the Internet. The service provider cloud 323 may provide information for the services performed by the mobile device 311, such as live traffic maps, information related to a location, navigation information, advanced driver support, a list of services, and/or information about services.

Figure 4:
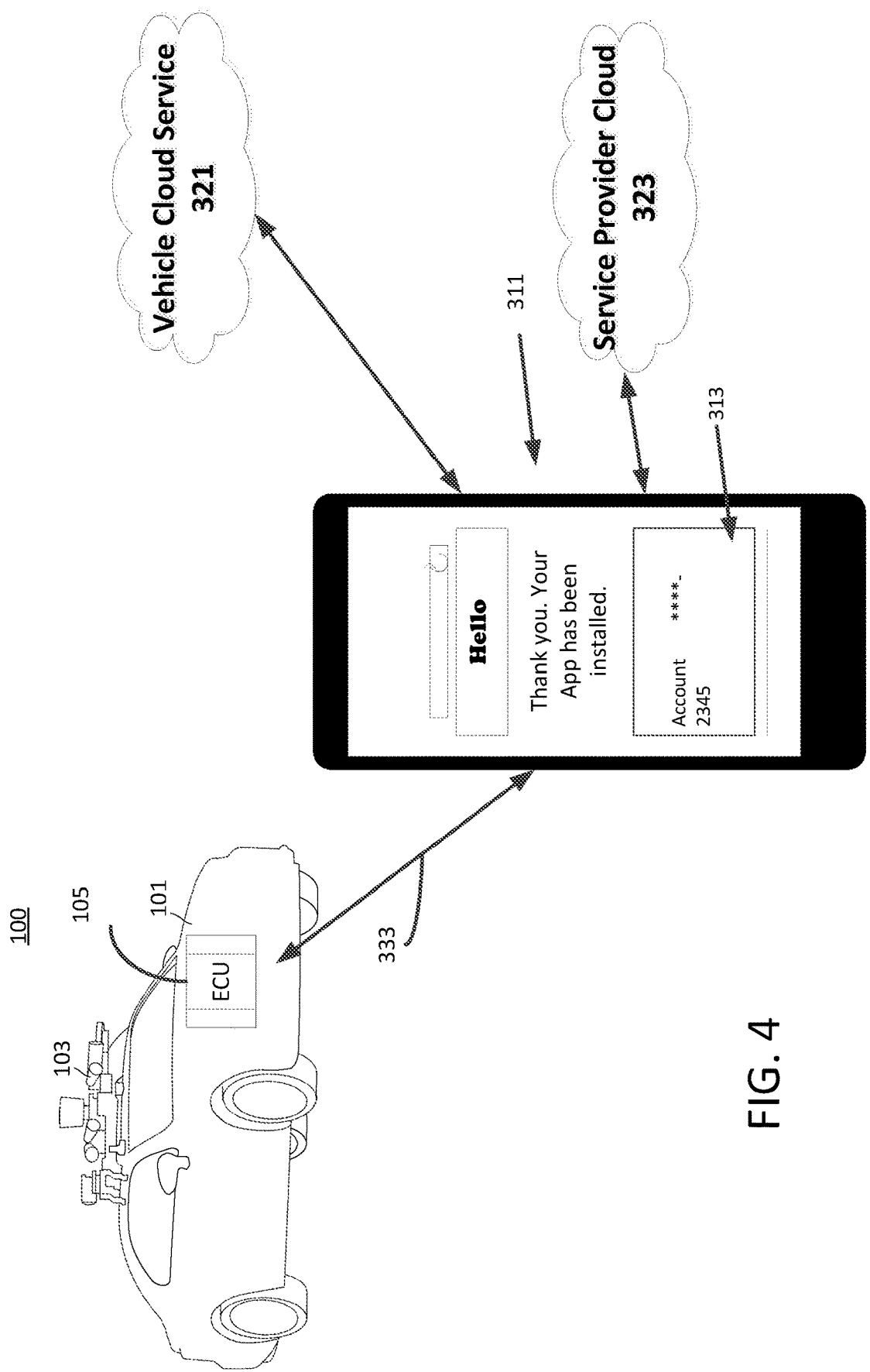
FIG. 4 is a diagram of a system for communication between a cloud service and a vehicle via a mobile application in accordance with an exemplary aspect of the disclosure.

FIG. 4 is a diagram of a system for communication between a cloud service and a vehicle via a mobile application in accordance with an exemplary aspect of the disclosure. The system in FIG. 4 is from the perspective of a vehicle owner or vehicle driver. Prior to the system of FIG. 4, a service provider may obtain a subscription to access sensor information from several groups of vehicles and receive signed subscription keys from the vehicle cloud service 321. The vehicle owner or driver may wish to obtain an App from a service provider that, for example, may include features for navigating in various traffic conditions in a manner that optimizes fuel usage and minimizes travel time. The vehicle owner or user may download and install the App from an app store, such as Apple App Store or Google Play Store. Once installed, the vehicle owner or user may initialize the App 313 by registering a vehicle, inputting any desired settings, and establishing an account. Information entered to initialize the App is provided to the service provider that developed the App, via a cloud service 323. The App 313 may display a request for permission to access specific sensor information from the vehicle ECU 105. The driver may electronically sign the request and anonymously share some onboard sensor information together with a service provider's cloud information. The vehicle ECU 105 verifies proof of subscription of the service provider's App, for example, by way of a signed public key obtained from the vehicle cloud service 321. Once initialized, the App may augment information supplied by the service provider with sensor information obtained from the vehicle ECU 105. In some embodiments, the vehicle ECU 105 may use a public key obtained from the App 313 to encrypt sensor data and transmit the encrypted data to the App 313.

The mobile App 313 may process data from vehicle sensors and produce metadata that is useful onboard the vehicle and probe data by cloud services (e.g., lane specific information and speeds). In this example, the service provider provides a navigation route to a destination using current location of the vehicle obtained from the vehicle GPS, and traffic conditions monitored by the service provider. While traveling along the navigation route, the App 313 may monitor fuel usage by the vehicle while obtaining updated traffic information from the service provider, and may make adjustments to the navigation route. In some embodiments, the graphical navigation route may be displayed in a display counsel of the vehicle. In some embodiments, the App 313 itself (via a navigation service) may provide audio and/or graphic display of the navigation route. In some embodiments, the App 313 may upload the processed data to the service provider cloud 323. The App 313 may provide services based on enhanced information provided by the service provider cloud 323 and the data from the vehicle sensors.

Figure 5:
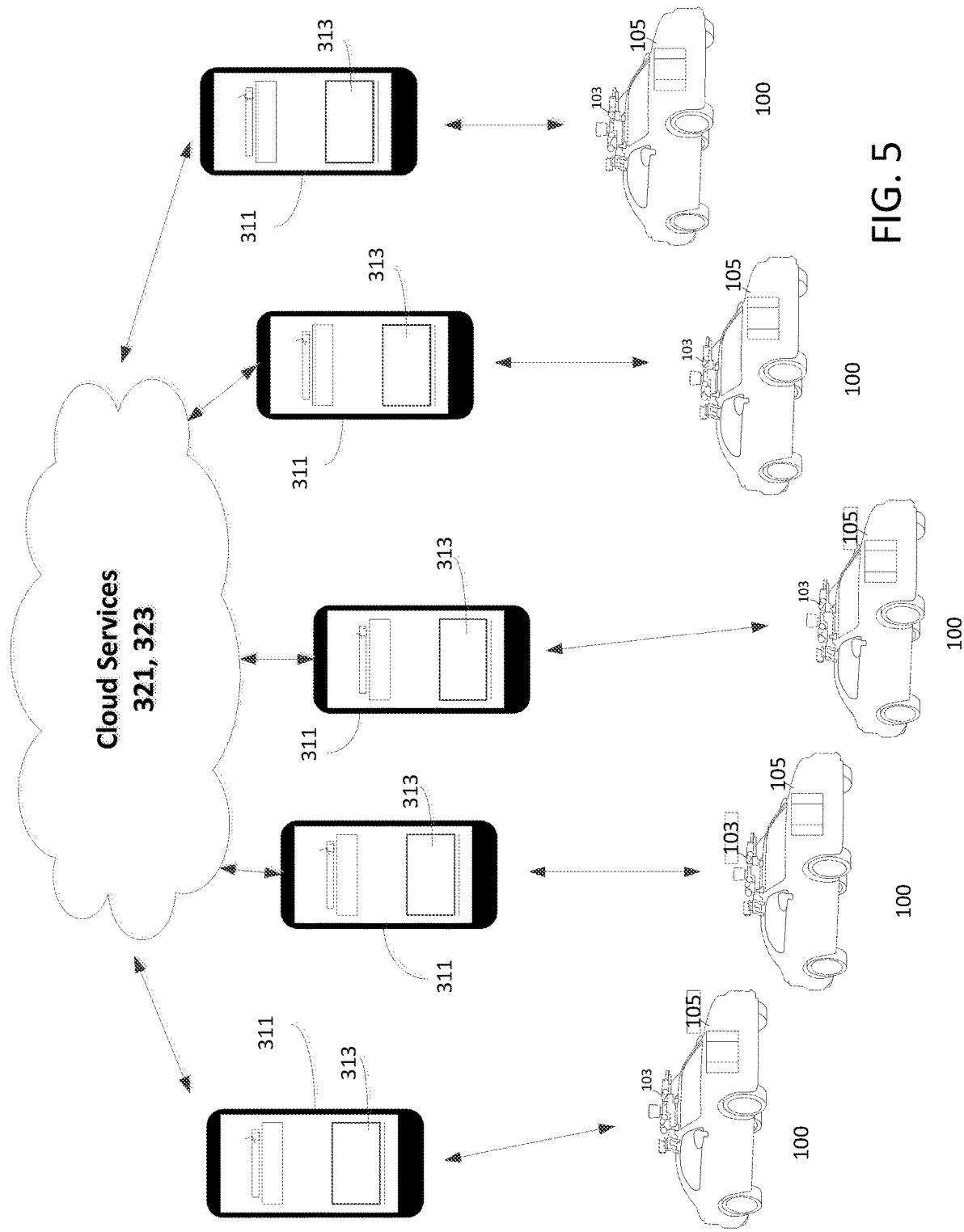
FIG. 5 is a diagram of a system for communication between a cloud service, a plurality of vehicles via a plurality of mobile applications.

FIG. 5 is a diagram of a system for communication between a cloud service and a plurality of vehicles via a plurality of mobile applications. FIG. 5 is from the perspective of a service provider. A service provider may obtain subscription keys from the vehicle cloud service in order to provide their services to a group of vehicles 100, each vehicle being associated with a mobile device 311. The vehicle owner or user may install a mobile App 313 in the mobile device 311 in order to obtain vehicle-related services provided by the service provider. The mobile device 311 acts as a conduit for accessing a subset of vehicle sensor information from a vehicle ECU 105 of the vehicle 100 and for obtaining information from a service provider cloud 323. As mentioned above, the group of vehicles may be a particular make and model of vehicle, and may be for vehicles in a particular geographic area, such as a state, region, or country. An App 313 augments the information received from the service provider cloud 323 with the subset of vehicle sensor information received from the vehicle ECU 105 in order to provide services to a driver or vehicle user.

Figure 6:
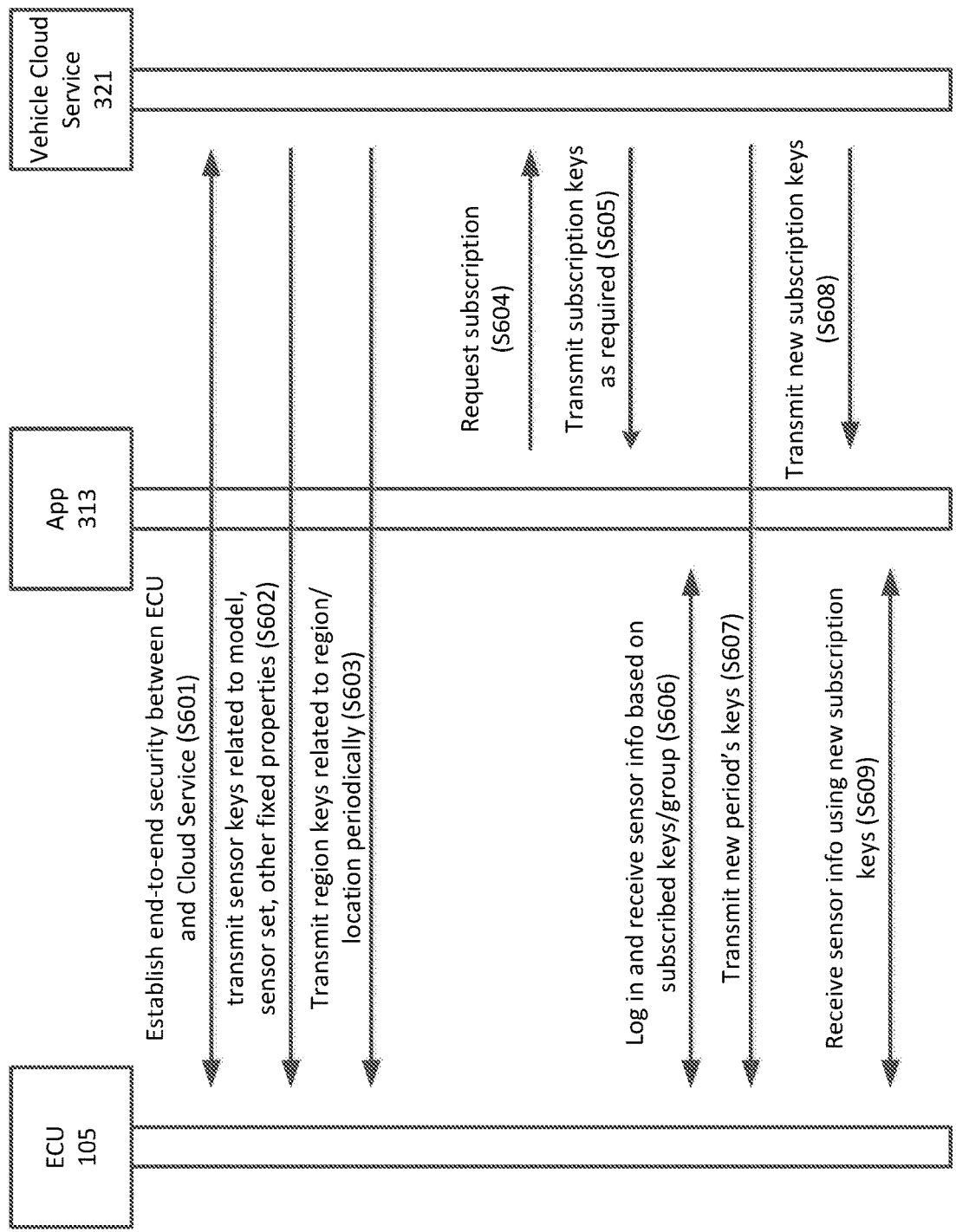
FIG. 6 is a flow diagram for a method of operation of the system in accordance with an exemplary aspect of the disclosure.

FIG. 6 is a flow diagram for a method of operation of the system in accordance with an exemplary aspect of the disclosure. The flow diagram includes the role of the vehicle OEM or after-market installer as a source of providing a subscription service, the role of the service provider of obtaining a subscription and distributing a service by way of an App to vehicle owners or users, the role of the ECU of a vehicle of providing vehicle sensor information in accordance with the subscription. The vehicle OEM or after-market installer provides a subscription service in a secure manner using asymmetric key pairs, referred to as subscription keys. The subscription keys may be periodically updated by the vehicle OEM or after-market installer.

Subscription keys are generated and provided by the vehicle cloud service 321 to both the vehicle ECU (sensor data provider) and a mobile device app (for an end user). In some embodiments, public sensor keys are provided to the vehicle ECU, and a pair of public and private subscription keys are provided to the mobile device app. The subscription keys are generated as part of a private key infrastructure (PKI). In some embodiments, the vehicle cloud service 321 generates a pair of keys using a public-key cryptosystem, for example RSA (Rivest-Shamir-Adleman). Before a vehicle leaves a vehicle OEM or after-market installer facility, initial public sensor keys may be installed in a memory of an ECU 105. In some embodiments, the sensor keys may include vehicle sensor access keys that are associated with a make, model and specific subset of vehicle sensors, as well as a specific characteristic of a sensor, such as sensor output rate. In some embodiments, the sensor keys may include region keys that are associated with a geographic location, such as state, region, or country.

In some embodiments, a service provider may purchase a subscription from the vehicle cloud provider 323. The cost of a subscription may be zero, or may be a cost based on the number of vehicles and types of sensor data, or may be a cost based on an amount and type of data uploaded. The service provider may purchase more than one subscription for different groups of vehicles and sensors.

In order to install initial sensor keys, in S601, end-to-end communications security is first established between the vehicle cloud service 321 and the ECU 105 of a vehicle. In some embodiments, the end-to-end security includes secure communications via factory installed Internet communications using Transport Layer Security. In particular, the cloud service 321 and the ECU 105 perform a handshaking procedure in which various parameters to establish the connection's security are agreed on.

In S602, the ECU 105 receives initial sensor access keys. The sensor access keys are public keys that are transmitted encrypted (end-to-end secure) and with some assumed or stated expiration date from the vehicle cloud service 321 to the ECU 105.

The initial sensor access keys are securely maintained in the ECU 105 and may include a sensor key associated with a specific vehicle, or a sensor key that is common to a vehicle model or vehicle type. In some embodiments, the sensor keys may include a key related to a particular sensor output rate. For example, one sensor key may be associated with a low sensor output rate, another sensor key may be for a medium sensor output rate, and a further sensor key may be for a high sensor output rate. The sensor output rate may be a sensor output sampling rate, or may be a periodic value/reading of the sensor output. Also, the sensor keys may include keys associated with particular subsets of vehicle sensors. In some embodiments, the sensor access keys may have an expiration time, such as every month or some other time period.

In some embodiments, in S603, the ECU 105 may receive and store keys related to a geographic location, such as a region of a country. The region keys are public keys that are transmitted encrypted (end-to-end secure) and with some assumed or stated expiration date from the cloud service 321 to the ECU 105. The keys related to the location of a vehicle may be updated periodically. In some embodiments, the location of a vehicle, is a location where the vehicle was purchased or rented.

The vehicle ECU 105 is configured to allow access to a subset of in-vehicle sensor data based on an authentication of the App 313. Authentication may be performed by verifying a public key that is digitally signed by the vehicle cloud service 321.

In S604, an App 313 may request service-provider subscription keys in order to access to specific vehicle sensor information, where the request is provided to the cloud service 321. The request may be in the form of a message that lists specific vehicle sensor information, and specific vehicles or groups of vehicles.

In S605, the App 313 may receive subscription keys from a service provider in accordance with the request. The subscription keys may be one or more private keys sent by the service provider 323 to the App 313 (encrypted).

In S606, the App 313 may log-in and the ECU 105 may transmit sensor information based on the service-provided subscription keys. The App 313 may log in by providing its public key. The vehicle ECU 105 searches for a matching key related to the vehicle and subset of sensor data, as well as region/location. The ECU 105 may use the sensor access public key to encrypt and transmit sensor information. The App 313 then can use the private key(s) to decrypt the information from the vehicle ECU 105 (encrypted using the public key). In some embodiments, before any sensor information is transmitted, the vehicle owner or vehicle user may be prompted to consent to the App accessing features of the mobile device, or to upload data about the mobile device. The vehicle owner or vehicle user may consent to the App by electronically signing a consent to anonymously share a subset of onboard vehicle data with the service provider cloud 323. Also, the sensor information may undergo post-processing by the ECU 105 before being transmitted.

In some embodiments, the ECU 105 does not transmit the sensor information to the App 313, and instead the ECU 105 performs enhanced functions using information received from a service provider based on a subscription set up by way of the App 313.

In addition, in some embodiments the vehicle ECU 105 may first verify proof of the subscription of the service provider's App 313. The ECU 105 may send a request message to check the subscription status of the App to the vehicle cloud service 321. The vehicle cloud service 321 encrypts the verification result of the subscription status using a public key. The ECU 105 decrypts the subscription status of the App using the subscription key as a private key. Depending on the type of sensor data, the App 313 may also stream processed sensor information to the service provider cloud 323.

The service provider cloud 323 may transmit information, such as maps, traffic data, to the App 313. The App 313 may process the vehicle sensor data and request data from service provider cloud 323, such as lane-specific traffic information and speeds. The processing of the vehicle sensor data may include measured values that require calculations, such as calculation of rate of fuel usage, and miles traveled.

In some embodiments, the vehicle cloud service 321 may periodically transmit updated sensor access keys to the vehicle ECU 105. When the service provider updates its subscription for a new subscription period, the vehicle cloud service 321 will store the new subscription and subscription keys in the database, and may update the service-provider subscription keys by digitally signing service-provider subscription keys, and transmitting the signed service-provider subscription keys to the App 313. In particular, periodically, in S607, the vehicle cloud service 321 may transmit new sensor access keys to the ECU 105. In S608, the vehicle cloud service 321 may transmit new service-provider subscription keys to the App 313, based on the subscription. In S609, the App 313 may continue to receive sensor information according to the new service-provider subscription keys and new sensor access keys.

In some embodiments, the App 313 sets up a subscription in which the subscription keys facilitate augmented functions within the vehicle. In other words, the information provided by a service provider via a service provider cloud 323 may be transmitted to the vehicle ECU 105 and augmented with vehicle sensor information to facilitate augmented functions of the vehicle. As an exemplary embodiment, information of a terrain may be provided by a geographic service provider and used in conjunction with an adjustable suspension system to tune the vehicle suspension based on a change in the terrain.

As another exemplary embodiment, information of traffic conditions on a planned route of an autonomous vehicle may be used to change the route settings of the autonomous vehicle to a new route or change its target destination setting. The vehicle ECU 105 may control the automated driving system based on these adjusted settings.

As a further exemplary embodiment, map information provided by a service provider may be transmitted to the vehicle ECU 105 and augmented with vehicle sensor information in order to provide enhanced services for an in-vehicle navigation system or an in-vehicle infotainment system.

Figure 7:
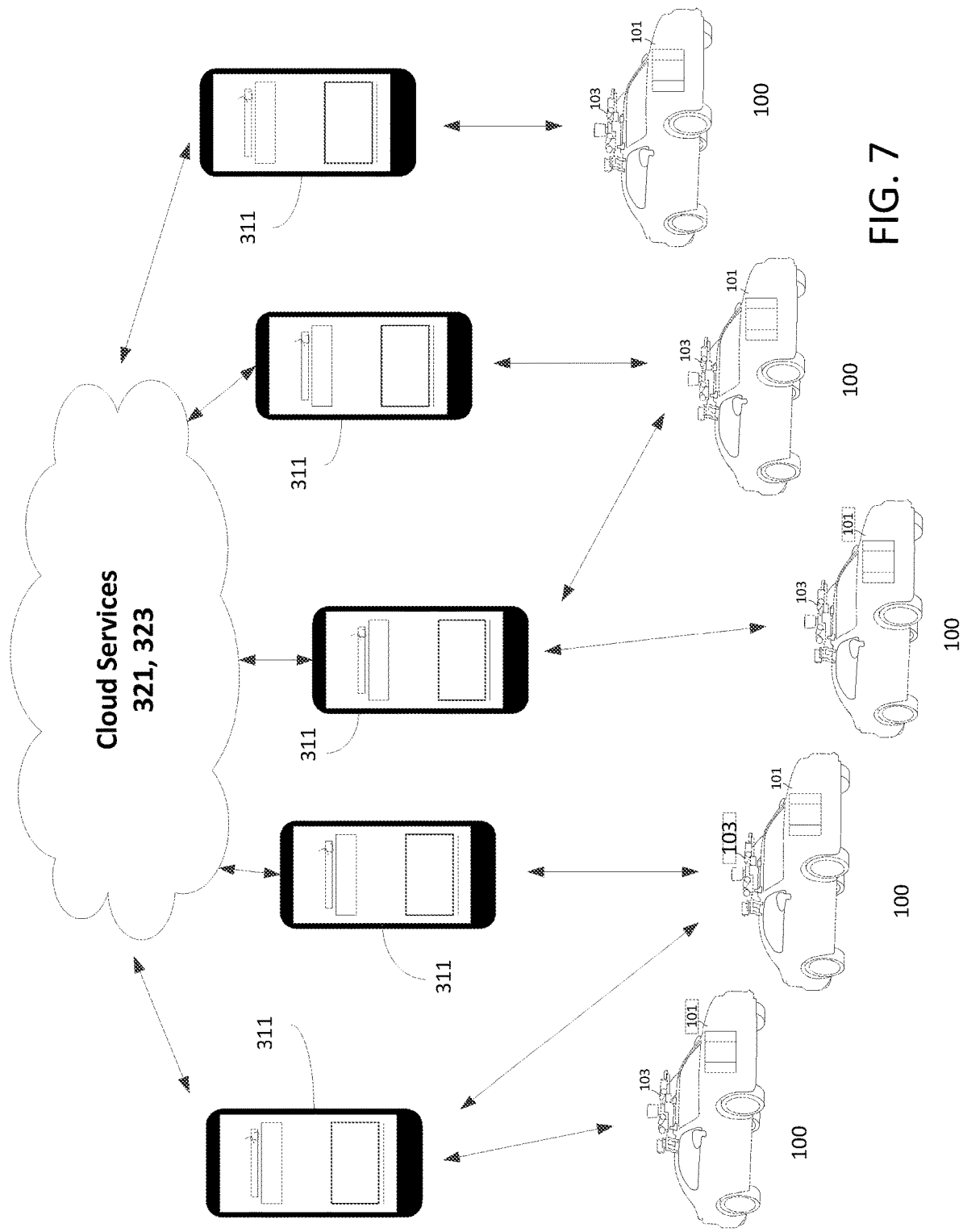
FIG. 7 is a diagram of a system for communication between a cloud service, a plurality of vehicles via a plurality of mobile applications.

FIG. 7 is a diagram of a system for communication between a cloud service, a plurality of vehicles via a plurality of mobile applications. In some embodiments, the App 313 may be installed and used to manage more than one vehicle 100. As an alternative, in some cases, more than one App 313 may be used to manage a common vehicle(s). For example, there may be cases where a driver of a vehicle and a third party may manage the same vehicle. The third party may be located remotely from the vehicle 100, such as in an office, while the driver of the vehicle is driving the vehicle, or is proximate to the vehicle 100. In other cases, there may be more than one user of the same vehicle.

Figure 8:
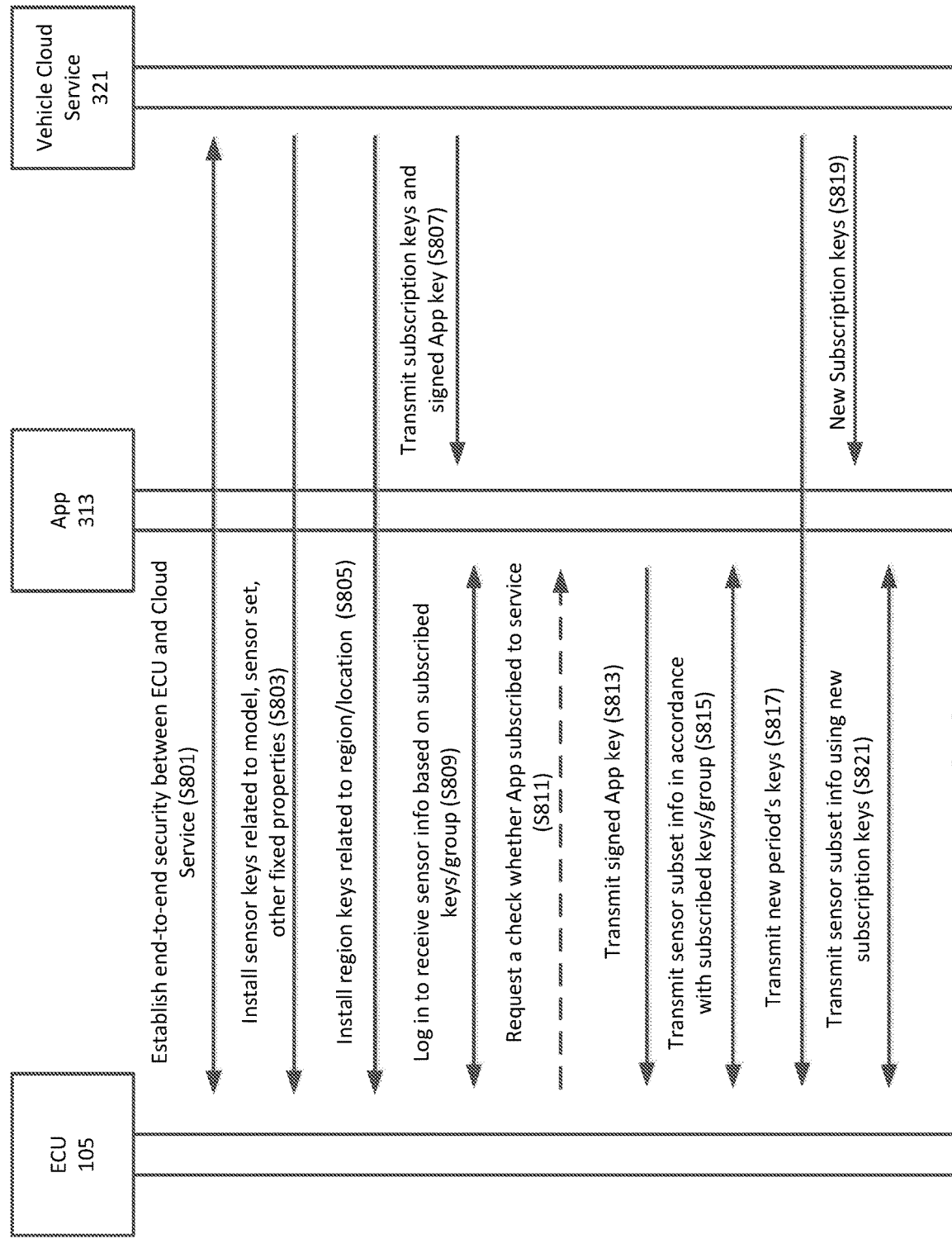
FIG. 8 is a flow diagram for a method of operation of the system in accordance with an exemplary aspect of the disclosure.

FIG. 8 is a flow diagram for a method of operation of the system in accordance with an exemplary aspect of the disclosure. In some embodiments, (S809) when an App 313 logs in to receive sensor information from an ECU 105, in S811, the ECU 105 may first send a request to check whether the App 313 has subscribed to a service. The request may be sent to a vehicle cloud service 321. In other embodiments, the App 313 may retrieve a signed App key without first requesting to check that the App 313 has subscribed to the service. In the other embodiments, the request may be sent to the App 313, which, in S807 has previously obtained a signed App key from the vehicle cloud service 321. In S813, the App 313 responds with a signed App public key. The App's public key that the vehicle ECU 105 receives had been signed by the vehicle cloud service 321. The App's public key identifies to the vehicle ECU 105 which data it's allowed to encrypt and send to the App 313.

Similar to FIG. 6, the initial sensor access keys are installed in an ECU 105 by way of a secure communication connection 331. In S801, the end-to-end security is established between the ECU 105 and the vehicle cloud service 321. In S803, sensor public keys related to model, sensor set, or other fixed properties are transmitted encrypted and installed in the ECU 105. In S805, region public keys related to region or location are transmitted encrypted and installed in the ECU 105. In S809, the App 313 may log in to the ECU 105 to receive sensor info based on subscription keys.

Once authenticated by receipt of the signed App key, in S815, the vehicle ECU 105 may use the App key received from the mobile App 313 in order to encrypt the sensor data to be transmitted. The sensor subset information is transmitted by the vehicle ECU 105 to the mobile App 313.

After a predetermined period, in S817, new sensor keys may be transmitted encrypted and installed in the ECU 105. In S819, provided an updated subscription, updated subscription keys may be transmitted to the App 313 based on the subscription. In S821, sensor subset info is transmitted to the App after decrypting a message verifying the subscription status using new subscription keys.

Figure 9:
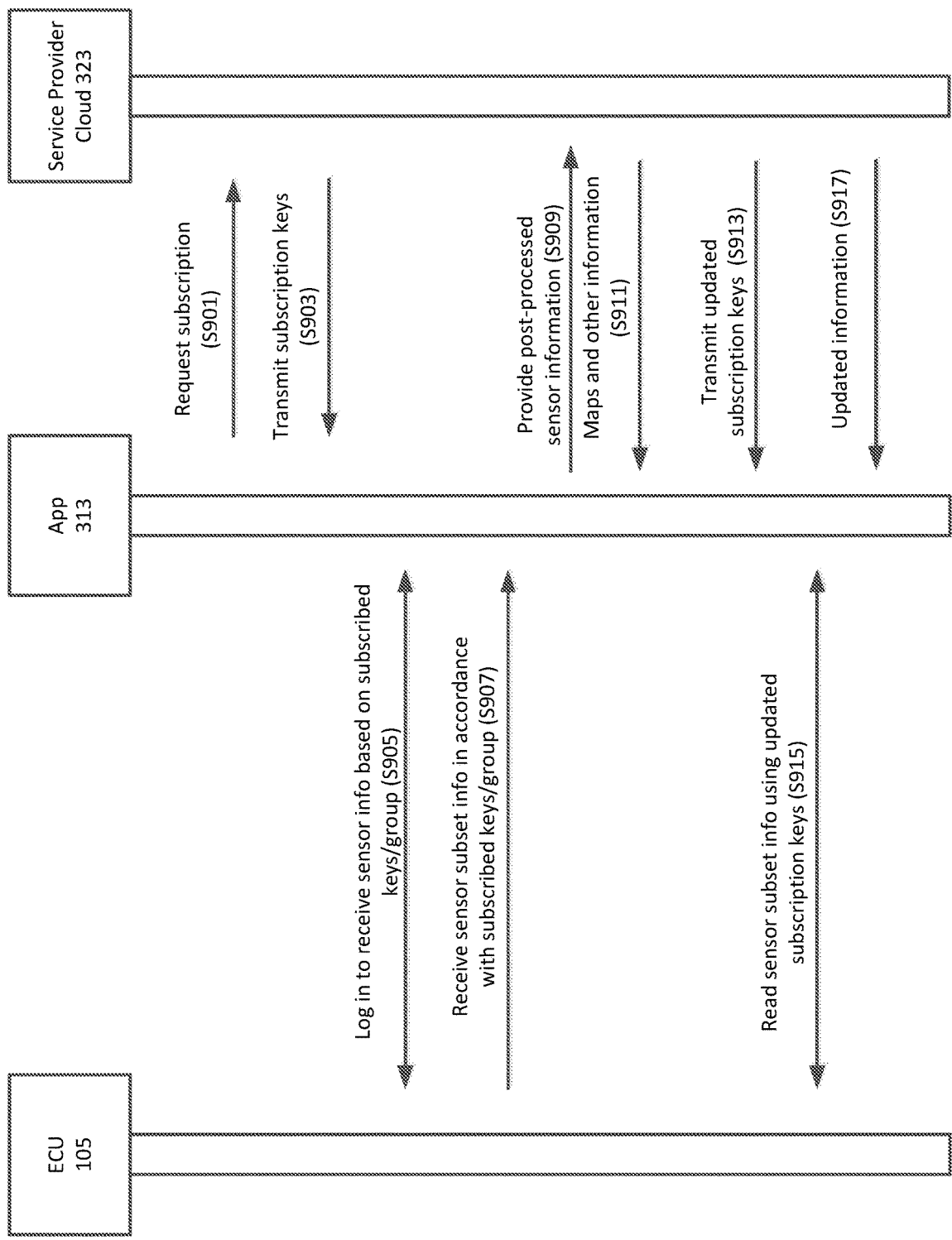
FIG. 9 is a flow diagram for a method of operation of the system in accordance with an exemplary aspect of the disclosure.

FIG. 9 is a flow diagram for a method of operation of the system in accordance with an exemplary aspect of the disclosure. In some embodiments, a service provider cloud 323 provides subscription keys and other information to the App 313. After an App 313 is downloaded and installed in a user mobile device, in S901, the App 313 may request subscription keys from the service provider cloud 323. In response, in S903, the service provider cloud 323 may sign and transmit subscription keys, including a pair of public and private keys to the App 313. The pair of subscription keys are active for specified dates, certain sensors, or other characteristics. In S905, the App 313 logs in to the ECU 105 to receive the certain sensor subset information based on the pair of subscribed keys. The App 313 transmits the public key to the vehicle ECU 105. The ECU 105, in S907, uses the public key to encrypt and send sensor subset information.

The App 313 decrypts the sensor subset information using the private key. The App 313, in S909, may provide post-processed sensor information to the service provider cloud 323. The service provider cloud 323, in S911, provides maps or other information to the App 313. After a predetermined period of time, in S913, the service provider cloud 323 may transmit updated subscription keys to App 313. After that, in S915, the ECU 105 provides sensor subset information using updated subscription keys. In conjunction, the service provider cloud 323, in S917, provides updated information to the App 313. The App 313 provides a consolidation of sensor subset information from the ECU 105 and the updated information from the service provider cloud 323.

Numerous modifications and variations of the present invention are possible in light of the above teachings. It is therefore to be understood that within the scope of the appended claims, the invention may be practiced otherwise than as specifically described herein.

The invention claimed is:

1. A method of facilitating a subscription to access a subset of vehicle sensor data for a predetermined period of time in a vehicle electronic control unit (ECU) to augment an information application, the method comprises:
   generating, by a vehicle subscription server using a public-key cryptosystem, at least one vehicle sensor key and at least one subscription key for the subscription, wherein the at least one vehicle sensor key is specific to a vehicle and sensor, including vehicle make, model, and a sensor feature;
   installing, in a memory of the vehicle ECU, the at least one vehicle sensor key and the at least one subscription key that expires after the predetermined period;
   in response to a request for the subscription by a mobile device as an advance agreement that permits access to the subset of the vehicle sensor data, transmitting, by the vehicle subscription server, the at least one subscription key;
   using the at least one subscription key, by the vehicle ECU, to authenticate the mobile device as having obtained the subscription;
   encrypting, by the vehicle ECU, the subset of vehicle sensor data using the at least one vehicle sensor key;
   transmitting, by the vehicle ECU, the encrypted subset of vehicle sensor data;
   decrypting, by the mobile device, using the at least one subscription key the encrypted subset of vehicle sensor data; and
   augmenting, by the mobile device, the information application with the subset of the vehicle sensor data that is specific to the vehicle make, model, and sensor feature.

2. The subscription method of claim 1, wherein in order to access the vehicle sensor data, the vehicle ECU sends a request to the vehicle subscription server to check whether the mobile device has obtained the subscription, and if so, receives a an encrypted subscription status, and the vehicle ECU decrypts the subscription status using the at least one subscription key.

3. The subscription method of claim 1, further comprising:
   transmitting to the information application map information, and augmenting the map information with the subset of the vehicle sensor data.

4. The subscription method of claim 1, further comprising:
   periodically updating the at least one vehicle sensor key installed in the memory of the vehicle ECU;
   transmitting, by the vehicle subscription server, an updated at least one subscription key to the mobile device; and
   outputting to the information application, by the vehicle ECU, the subset of the vehicle sensor data based on the updated at least one subscription key.

5. The subscription method of claim 1, further comprising:
   installing, in the memory of the vehicle ECU, at least one region key for a geographic region;
   in response to the request for the subscription, transmitting, by the vehicle subscription server, the at least one region key; and
   outputting to the information application, by the vehicle ECU, the subset of the vehicle sensor data based on the at least one subscription key and the at least one region key.

6. The subscription method of claim 5, further comprising:
   periodically updating the at least one vehicle sensor key and the at least one region key;
   transmitting, by the vehicle subscription server, the updated at least one vehicle sensor key and the updated at least one region key to the information application; and
   outputting to the information application, by the vehicle ECU, the subset of the vehicle sensor data based on the updated at least one vehicle sensor key and the updated at least one region key.

7. A subscription method of facilitating permission-based access to a subset of vehicle sensor data in a vehicle electronic control unit (ECU) to augment an information application, the method comprises:
   generating, by a vehicle subscription server, at least one vehicle sensor key and at least one subscription key;
   installing, in a memory of the vehicle ECU, the at least one vehicle sensor key;
   in response to a request for a subscription by a mobile device, transmitting, by the vehicle subscription server, the at least one subscription key;
   using the at least one subscription key to authenticate the mobile device as having obtained the subscription;
   augmenting, by the vehicle ECU, the information application with the subset of the vehicle sensor data accessed based on the at least one vehicle sensor key;
   installing, in the memory of the vehicle ECU, at least one region key for a geographic region;
   in response to the request for the subscription, transmitting, by the vehicle subscription server, the at least one region key;
   outputting to the information application, by the vehicle ECU, the subset of the vehicle sensor data based on the at least one subscription key and the at least one region key;
   installing, in the memory of the vehicle ECU, a plurality of different vehicle group sensor keys each for a group of vehicles;
   in response to the request for the subscription, transmitting, by the vehicle subscription server, a subset of the plurality of vehicle group sensor keys to the information application; and
   outputting to the information application, by the vehicle ECU, the subset of the vehicle sensor data based on the at least one subscription key and the subset of the plurality of vehicle group sensor keys.

8. The subscription method of claim 7, further comprising:

periodically updating the plurality of vehicle group sensor keys;

transmitting a subset of the updated plurality of vehicle sensor keys to the information application in accordance with an updated subscription; and outputting to the information application, by the vehicle ECU, the subset of the vehicle sensor data based on the subset of the updated plurality of vehicle group sensor keys.

9. The subscription method of claim 7, wherein the transmitting the subset of the plurality of vehicle group sensor keys includes digitally signing the subset of the plurality of vehicle group sensor keys.

10. The subscription method of claim 9, wherein the vehicle ECU communicates with the vehicle subscription server via the mobile device and the mobile device transmits an application key to the vehicle ECU that is digitally signed in the vehicle subscription server.

11. The subscription method of claim 10, wherein the vehicle ECU verifies proof of subscription using the signed application key.

12. The subscription method of claim 11, wherein the vehicle ECU transmits vehicle sensor data that belongs to a group allowed by a digitally signed subset of the plurality of vehicle group sensor keys.

13. The subscription method of claim 12, further comprising:

receiving the application key from the information application, and where the vehicle ECU transmits the vehicle sensor data by encrypting the vehicle sensor data using the application key.

14. The subscription method of claim 13, further comprising:

receiving, by the vehicle subscription server, the vehicle sensor data from the mobile device.

15. A system for facilitating a subscription to access a subset of vehicle sensor data for a predetermined period to augment an information application, the system comprises:

a vehicle subscription server configured to generate at least one sensor public key and at least one subscription key using a public-key cryptosystem, each said key having respective predetermined expiration dates, wherein the at least one sensor public key is specific to a vehicle and sensor, including vehicle make, model, and a sensor feature;

a vehicle ECU connected to a plurality of in-vehicle sensors;

a memory of the vehicle ECU to store the at least one sensor public key and the at least one subscription key;

in response to a request for the subscription by the information application as an advance agreement that permits access to the subset of the vehicle sensor data, the vehicle subscription server is configured to transmit the at least one subscription key;

the vehicle ECU is configured to encrypt the subset of vehicle sensor data using the at least one vehicle sensor key, transmit the encrypted subset of vehicle sensor data;

the mobile device is configured to decrypt, using the at least one subscription key, the encrypted subset of vehicle sensor data, and augment the information application with the subset of the vehicle sensor data that is specific to vehicle make, model, and sensor feature.

16. The system of claim 15, wherein the vehicle ECU is configured to send a request to the vehicle subscription server to check whether the information application has obtained the subscription, and if so, receive an encrypted subscription status, and decrypt the subscription status using the at least one subscription key.

17. The system of claim 15, wherein:

the information application receives map information which is augmented with the subset of the vehicle sensor data.

18. The system of claim 15, further comprising:

the memory of the vehicle ECU periodically updates the at least one sensor public key;

the vehicle subscription server is configured to transmit an updated at least one subscription private key to the information application; and the vehicle ECU is configured to encrypt and augment the information application with the subset of the vehicle sensor data, using the updated at least one sensor public key, to be decrypted based on the updated at least one subscription private key.

19. The system of claim 15, wherein:

the memory of the vehicle ECU is configured to store at least one region public key for a geographic region;

the vehicle subscription server is configured to transmit, in response to the request for the subscription, the at least one subscription private key; and the vehicle ECU is configured to encrypt and augment the information application with the subset of the vehicle sensor data, using the at least one region public key and the at least one sensor public key, to be decrypted based on the at least one subscription private key.

20. The system of claim 19, wherein:

the vehicle subscription server is configured to periodically update the at least one sensor public key and the at least one region public key;

the vehicle subscription server is configured to transmit an updated at least one subscription private key to the information application; and the vehicle ECU is configured to encrypt and augment the information application with the subset of the vehicle sensor data, using the updated at least one sensor public key and the updated at least one region public key, to be decrypted based on the updated at least one subscription private key.

* * * * *